C. F. H. HUFF.
Horse-Collars.
No.150,161.    Patented April 28, 1874.
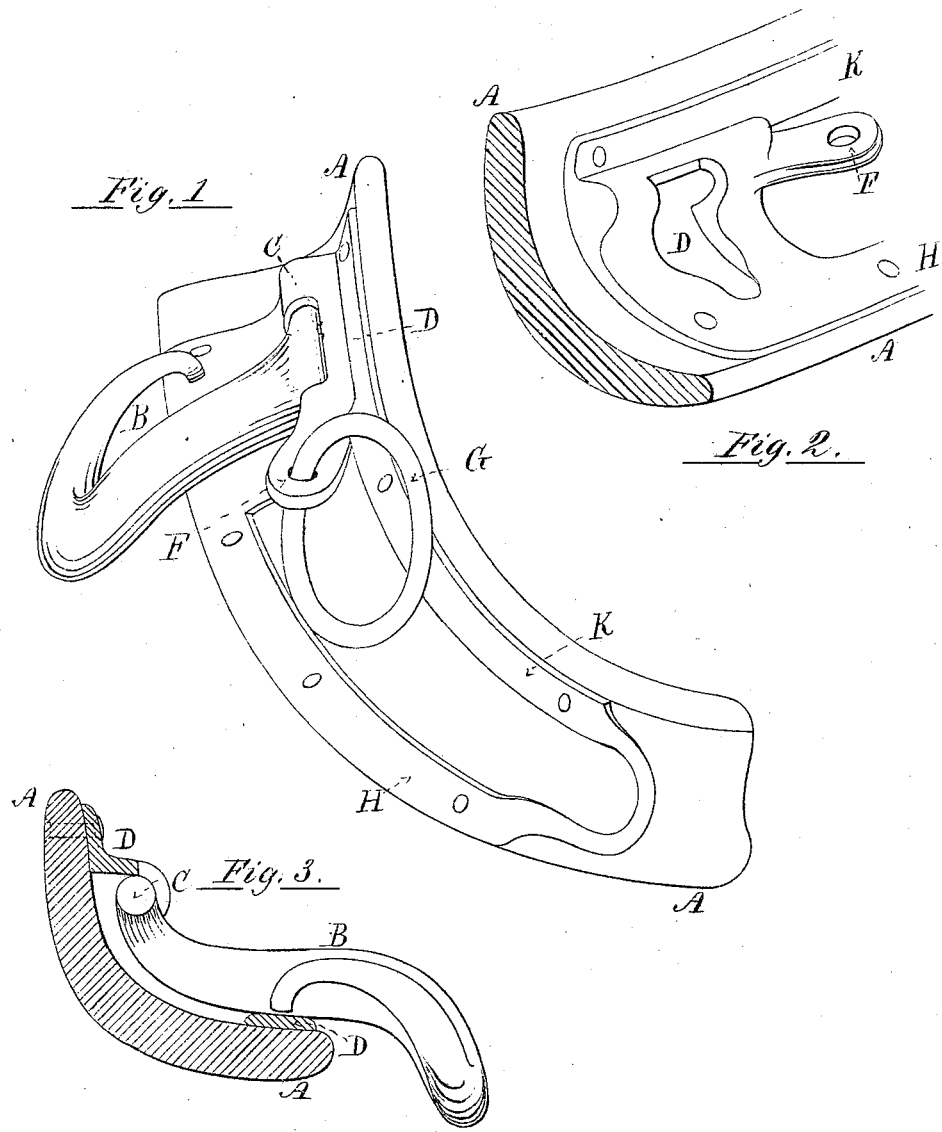
WITNESSES:
E. V. Eliot
Saml. F. Hay.
INVENTOR.
Chancy F. H. Huff

UNITED STATES PATENT OFFICE.

CHANCY F. H. HUFF, OF NEW YORK, N. Y.

IMPROVEMENT IN HORSE-COLLARS.

Specification forming part of Letters Patent No. 150,161, dated April 28, 1874; application filed June 1, 1872.

*To all whom it may concern:*

Be it known that I, CHANCY F. H. HUFF, of the city, county, and State of New York, have invented certain Improvements in Horse-Collars, of which the following is a specification:

This invention is chiefly applicable to collars made of wood or some similar substance, and in which the hames are dispensed with, or where the mountings are attached directly to the collar instead of the hames; and it consists chiefly, first, in the peculiar shape or form of the hook to which the traces are to be attached; and, second, to the clasp or fastening which binds said hook to the collar, and which holds, also, the ring for the breast-strap and the loop for binding the two halves of the collar together.

Figure 1 is a view, in perspective, of a portion of the collar, showing all the parts claimed in this application as attached to the collar. Fig. 2 is a view of a portion of the clasp as applied to the section of the collar shown in Fig. 1. Fig. 3 shows a cross-section of the collar and the clasp and a plan of the hook as would appear in looking down upon it when in working position.

A A represent a portion of a collar made of wood, the outer and inner surfaces of which are nearly parallel, or, as expressed in a patent to one C. K. Marshall, who claims such a form, "the convex and concave" surfaces, whereby the collar is made very light, and yet sufficiently strong to dispense with the use of hames. The hooks B, for attaching the traces to the collar, are formed with a T-end, as at C, the pivots of which are clasped underneath the plate D, which is sufficiently swelled at that point; and said plate is riveted fast to the collar, as plainly indicated at E, Fig. 3. Said hook is curved back from the T-end in such a form that an edge view is somewhat S-shaped, as best shown in Fig. 3, and the hooked portion is curved upward over the S-shaped part and inward toward the T-end, where it is again curved, near the tip or point, toward the collar, in such a manner that the hook must be lifted or raised out from the collar before the trace can be unhooked or removed therefrom.

Such a curvation of the hook furnishes two very important improvements, the first of which is, it has two working-points upon the collar—viz., the T-end and the middle of the hook. The T-end is held under the plate D, near the front edge of the collar, while the middle, projecting through the plate, rests upon another portion of the same plate, near the back edge of the collar, and thereby distributes its action upon two points of the plate, and thereby greatly reduces the possibility of its being torn or forced from the collar, as would be done, likely, in the case, of working from only one point. The second advantage of such a shaped hook is, that the weight of the trace itself is always sufficient to keep the hook upon the collar, so that it cannot possibly become unhooked or detached by the forward movement of the trace-iron.

The rings for the breast-straps have heretofore been attached to such collars by staples or eyes attached independently of the trace-hooks; but it is found preferable to form said eyes as parts of the hook-plates, like a bracket, as shown at F, Figs. 1 and 2, and attach the rings G for the said straps thereto, as shown in Fig. 1, thereby dispensing with extra or other parts and additional riveting. For wooden collars it is also found preferable to connect the loop or eye, through which the strap is passed that binds the two halves of the collar together, with the hook-plate D, as shown in Fig. 1 at H and K, so that the metal straps or plates will assist in giving strength to the collar where the wood is cut across the grain in the curved portions thereof; and such an arrangement will require less riveting to hold said loops or eyes firmly attached to the collar.

The clasp or plate D, with its bracket F for the breast-strap ring, is usually cast in one piece; but the two may be forged separately, and riveted together before being attached to the collar. So, also, the straps H and K may be wrought and attached in any convenient manner to the plate D; but it will be found preferable to make them all in one piece, as shown in Fig. 1, and of malleable cast-iron, which is found to be sufficiently strong and quite inexpensive as compared with forgings.

I therefore claim—

1. The hook B, formed as herein shown, and provided with journals, which have their bearings in the semi-cylindrical recesses of the plate B, as set forth.

2. The combination of the hook B with clasp D, with or without straps H and K, having ring-bracket F, as described, as and for the purposes set forth.

CHANCY F. H. HUFF.

Witnesses:
E. N. ELIOT,
SAML. F. HAY.